Figure 1:
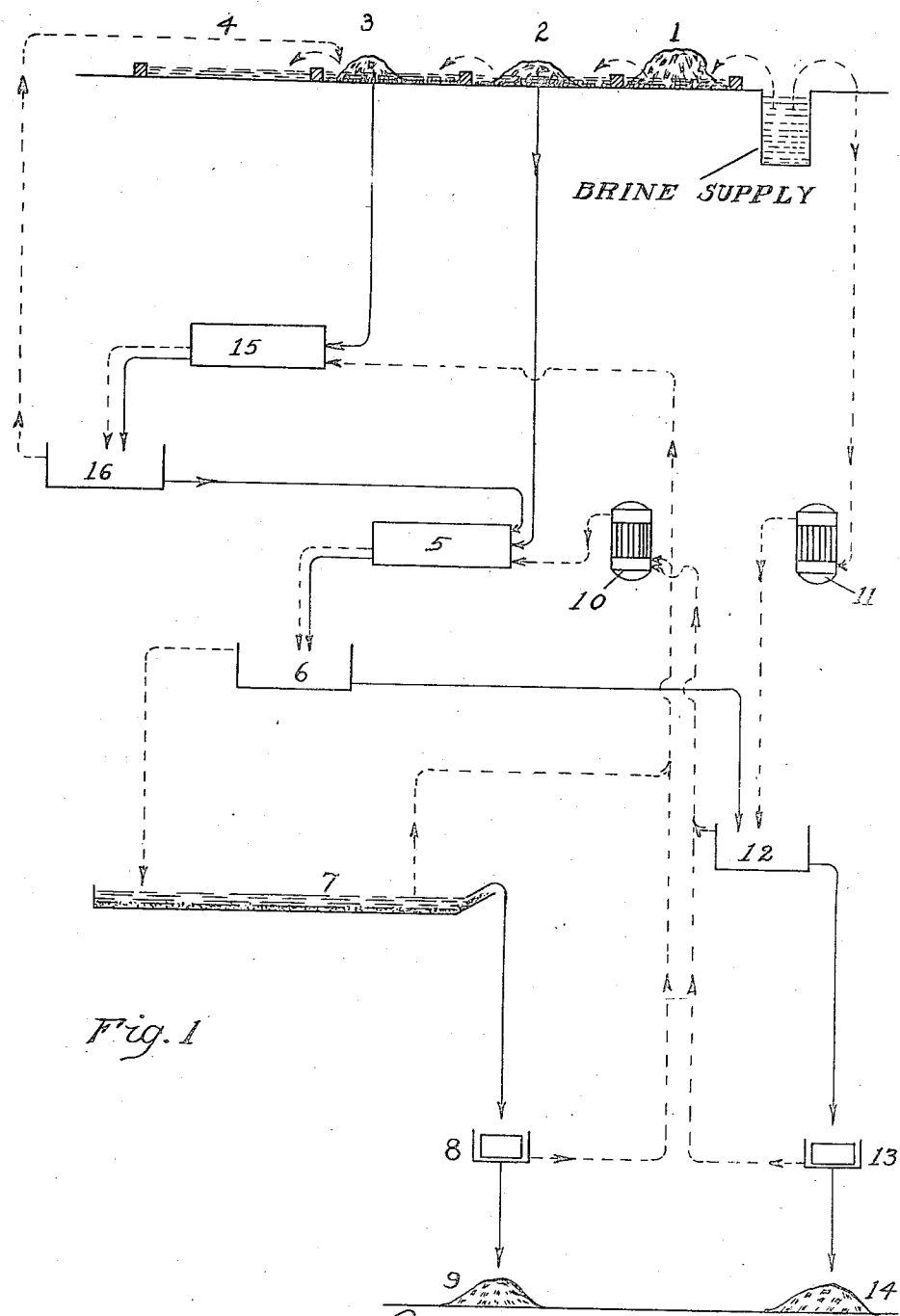

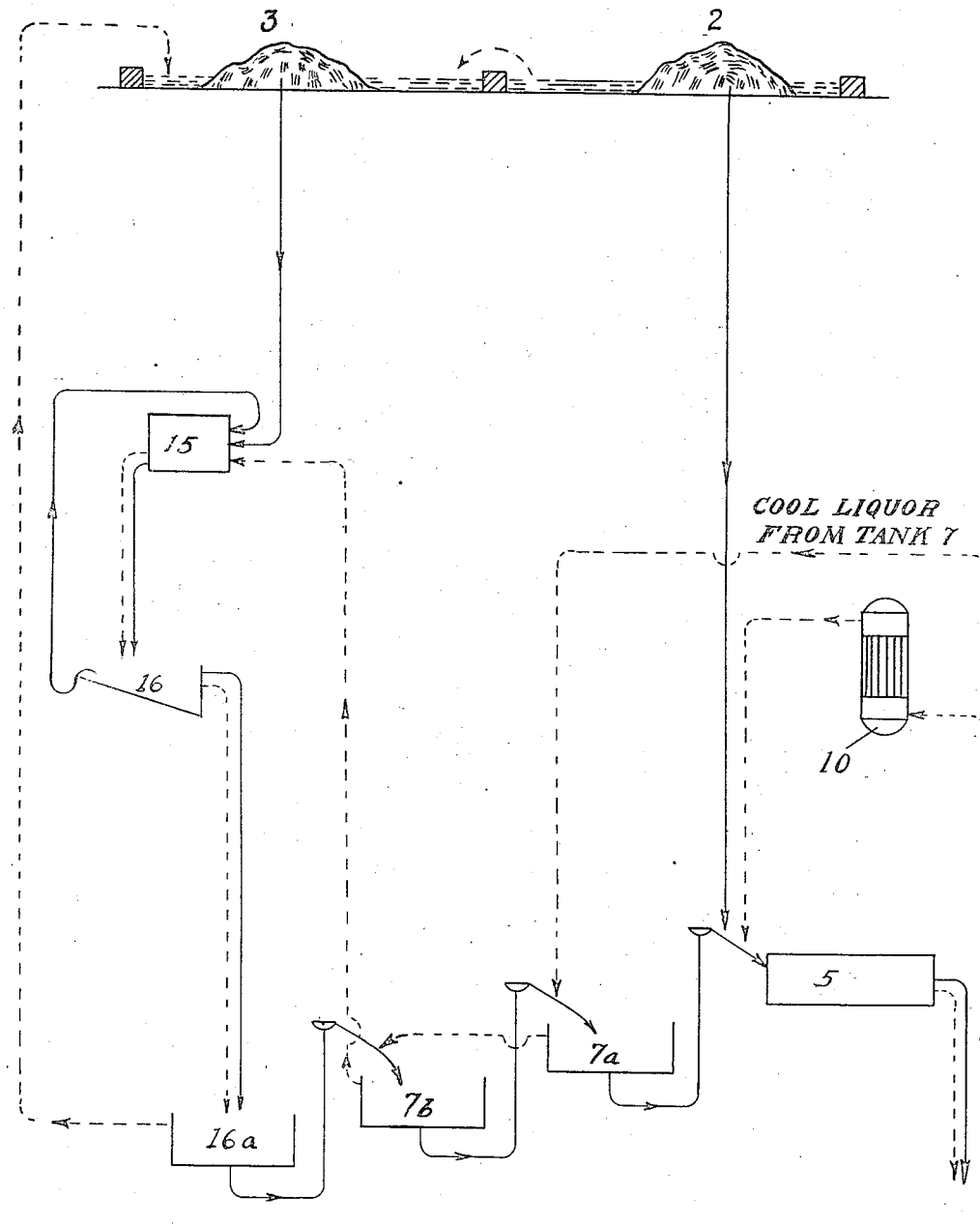

Patented Oct. 24, 1922.

1,432,796

UNITED STATES PATENT OFFICE.

JOSEPH L. SILSBEE, OF SALT LAKE CITY, UTAH.

METHOD OF RECOVERING POTASSIUM CHLORIDE FROM BRINE.

Application filed April 12, 1920, Serial No. 373,183. Renewed March 22, 1922. Serial No. 545,897.

*To all whom it may concern:*

Be it known that I, JOSEPH LYMAN SILSBEE, a citizen of the United States, residing at Salt Lake City, in the county of Salt Lake and State of Utah, have invented certain new and useful Improvements in Methods of Recovering Potassium Chloride from Brine; and I do hereby declare the following to be a full, clear, and exact description of the invention, such as will enable others skilled in the art to which it appertains to make and use the same.

This invention relates to the recovery of potassium chloride from brines and pertains more particularly to an improved method of recovery of potassium chloride from those brines containing a large proportion of magnesium chloride.

In my co-pending application, Serial No. 332,441, filed October 22, 1919, there is described and claimed a method of recovering potassium chloride from brines containing a relatively small proportion of magnesium chloride, and my present invention includes many of the steps employed in the method described in that application, to which reference may be had, but my present method also employs other steps by which the further objects of my present invention are attained.

These objects are, first, to devise a method of recovering potassium chloride which is applicable also to brines containing a large proportion of magnesium chloride, and to make possible the recovery of a greater percentage of the potash content of the original brine than is possible by the method described in my former application.

A further object of my invention is to reduce the amount of potassium chloride in the liquor discharged from the refinery; in other words, to make a greater and an almost complete recovery of potassium chloride from the crude potash salts brought into the refinery.

The principal steps of the method described in my above-mentioned application, as may be seen by reference thereto, are, briefly, the production by solar evaporation of crude crystalline material which is richer in potassium than the brine; dissolving the potassium salt by adding a heated solvent liquor and forming a hot saturated potassium chloride solution. This solution contains so small a proportion of magnesium chloride that it will precipitate potassium chloride on cooling, without the precipitation of sodium chloride.

While the potassium-saturated solution is hot, it is first separated from the undissolved solids, then cooled and permitted to deposit its potassium chloride, which is later removed.

A portion of the cold mother liquor, from which the greater proportion of the potassium content has been deposited, is also removed, and make-up liquor containing a less percentage of magnesium chloride is substituted therefor. A solvent liquor, consisting of the bulk of the cold mother liquor and the make-up liquor, is thus produced, which after being heated and mixed with a further supply of crude crystalline material, will contain so small a proportion of magnesium chloride that it will not precipitate sodium chloride upon cooling. This combined mother liquor and make-up liquor when heated thus forms a solvent for a new supply of crude crystalline material.

The process is thereby made to operate in cycles, a portion of the cold mother liquor being removed at each cycle of operations.

The foregoing method is well adapted for treatment of brine low in magnesium chloride, but it is not so well adapted for other brines containing a large proportion of magnesium chloride, and it is the purpose of my present invention to provide means whereby the foregoing method may be adapted to the economical and efficient recovery of potassium chloride from high magnesium chloride brines, from brines containing appreciable percentages of magnesium and sulphates, as well as to increase the percentage of potassium chloride that is directly recovered from a low magnesium chloride brine.

In carrying out my previously mentioned method I removed the crude material, that is, the combined potassium-sodium chloride salts, from the solar vat in which it had been deposited and transferred it to the refinery, where it was treated with a hot solvent liquor in the manner just described. I also removed the potassium-magnesium-sodium chloride salts, or crude carnallite, from the solar vats and treated the crude carnallite salts by means of the hot solvent liquor.

In my present method, the so-called crude carnalite salts which are deposited in the solar vats are not mixed with the crude potassium-sodium chloride salts, but are first treated separately to remove as much as possible of the magnesium chloride contents of the crude carnallite salts, after which the residual salts carrying a less amount of magnesium chloride are sent to the hot potassium chloride dissolver.

In this manner, the magnesium chloride content of the hot dissolver is kept low, although the original crude salts may contain a very large portion of magnesium chloride. The cold mother liquor which is removed from the system at each cycle of operation in the method described in my copending application, is in my present method, not discharged directly from the refinery, but while still cold is used to wash and dissolve the magnesium chloride contents of the said incoming crude carnallite salts before introducing those salts into the hot dissolver.

The cold mother liquor which is thus used to wash the potassium-magnesium bearing salts or crystals is saturated at this temperature in respect to potassium chloride, but is not saturated in respect to magnesium chloride; it, therefore, has the property of dissolving more magnesium chloride, and at the same time of throwing out of solution a certain portion of its potassium chloride contents (that is, as the magnesium chloride content of the liquor increases, the potassium chloride content decreases). The effect, therefore, of washing a potassium-magnesium chloride salt or crystal with such a liquor would be to increase the magnesium chloride and decrease the potassium chloride content of the liquor, while decreasing the magnesium chloride, and increasing the potassium chloride content of the solid; and thus decreasing the amount of potassium chloride discharged from the refinery and increasing the percentage of potassium chloride recovered from the crude salts brought into the refinery.

For example, in my above-mentioned application, it has been pointed out that it was desirable that the cold mother liquor (from which the potassium chloride content has in part been precipitated by cooling) should not contain more than one-hundred-fifty grams per litre of magnesium chloride per one-thousand grams of water, in order to prevent the precipitation of sodium chloride. At twenty-five degrees centigrade a liquor containing in solution approximately one-hundred-fifty grams of magnesium chloride, one-hundred-fifteen grams of potassium chloride, and one-thousand grams of water, will dissolve roughly an additional two-hundred-twenty grams of magnesium chloride and at the same time precipitate approximately seventy grams of potassium chloride from solution.

My improved method is illustrated diagrammatically in the accompanying drawings, in which Fig. 1 is a typical flow-sheet showing the complete method.

Fig. 2 is a flow-sheet showing that part of my improved method which pertains to the use of the residual liquor from the cooling tank for washing the incoming crude carnallite prior to the discharging of said liquor from the refinery.

Referring to Fig. 1, 1 represents the solar vats or ponds in which the brine is first evaporated and in which a large part of the sodium chloride is deposited. 2 are the crude potash vats in which the mixed salts of potassium and sodium are deposited. 3 are the carnallite vats in which the residual liquor from the vats 2 is further evaporated for the production of a potassium-magnesium chloride salt, and 4 are vats for the storage of the concentrated magnesium chloride liquor. In this method there may be two sources of crude material, namely, vat 2 yielding crystals consisting essentially of a mixture of potassium and sodium chlorides, and vat 3 yielding essentially a mixture of potassium, magnesium and sodium chlorides, or crude carnallite. These two materials may be treated separately in the present refining process.

Under certain circumstances, that is, in cases where, in the original brine there is a relatively large percentage of magnesium chloride—that is, where the magnesium chloride, calcium chloride ratio is large—or where there is such a large amount of sulphate in the original brine that it becomes advisable to return a part of the magnesium chloride to the second vats in order to prevent the precipitation of a portion of the potassium as one of the double salts of potassium sulphate, it may not be advisable to attempt to precipitate separately—as in vat number 2—a mixture consisting essentially of potassium and sodium chlorides, but to attempt only to obtain by solar evaporation, a solid with as high a percentage of potassium as possible, and consisting essentially of a mixture of potassium, magnesium and sodium chlorides. In a case such as this, there would be but one source of supply going to the refinery, and all incoming crude salts will be first washed by a cold mother liquor from the tanks in which the refined potassium chloride is precipitated.

The material from vat 2 may be treated in a dissolver 5 with a hot solvent liquor, and the resulting saturated potassium chloride solution and the residual sodium chloride crystals are then separated, as in a separator 6. The resulting common salt is removed and washed in a salt washer 12 by means of fresh brine from the brine supply. The washed salt is then if desired, centrifuged, as at 13, and stored, as at 14.

The liquor from separator 6 is cooled, as in a cooling tank 7, depositing crystalline potassium chloride, which is removed and may be centrifuged, as at 8, and stored, as at 9.

In my present method part of the residual liquor from cooling tank 7 is heated, as in a heater 10, and then re-used in dissolver 5, to treat a new supply of crude material from solar vat 2, and a new supply of potash-bearing salts from vat 3, said salts having been first deprived of the major part of its magnesium chloride by washing, as will presently be described. The remainder of the cold mother liquor from tank 7 is in my present method employed while still cold, to wash the crude carnallite salts coming from vat 3, the purpose being, as above stated, to dissolve as much as possible of the magnesium chloride contents of said crude salts and at the same time to force out of solution as great a proportion as possible of the potassium chloride content of the liquor, the magnesium chloride of the salts replacing the potassium chloride in the mother liquor.

This preliminary washing of the incoming crude carnallite salts takes place in a suitable dissolver 15, and the mixture of washed salts and liquor is separated, as at 16. After separation, the washed salts from 16 are delivered to the hot dissolver 5, as above noted, these salts now containing a lower percentage of magnesium chloride.

The cold wash liquor from 16 is then returned to the carnallite vats 3 for further evaporation and for the formation of an additional supply of carnallite, or is further concentrated by artificial heat for the production of carnallite and magnesium, or is discarded altogether.

The preliminary washing of the crude carnallite salts by means of the cold liquor from tank 7 may be accomplished as indicated in Fig. 1, by first mixing the said liquor and salts in dissolver 15 and then settling and separating in a separator 16, or a more complete method of mixing and separating the salts and cold liquor may be employed. Such a method is illustrated in Fig. 2, to which reference may now be had.

In this exemplification of my method the counter-current system of washing and separating is employed, as for example, a series of thickeners $7^a$, $7^b$, $16^a$ and a separator or classifier 16. Cool liquor from tank 7 of Fig. 1 passes successively through thickeners $7^a$ and $7^b$ before it enters the cold carnalite dissolver 15, instead of passing directly from tank 7 to the dissolver.

The mixture of crystals and magnesium chloride liquor may be delivered from dissolver 15, to a classifier 16, which separates the liquor and fine crystalline particles carried in suspension from the larger crystals.

The large crystals may be returned to the dissolver 15 for subsequent treatment, i. e., the dissolving action of the fresh cold liquor, and the mixed liquor and fine crystals are delivered to a thickener $16^a$. The clear liquor from this thickener is returned to the carnallite vats 3 for further evaporation and production of carnallite, or is otherwise disposed of as mentioned above, while the fine crystals are delivered successively to thickeners $7^b$ and $7^a$, where they are washed with liquor from tank 7, and thence the fine crystals pass to the hot dissolver 5, where (in case there are two sources of crude salts) they meet the combined potassium and sodium chloride crystals from solar vat 2. In the hot dissolver 5 the salts are washed by hot brine from a heater 10, as in my previous process above mentioned.

The washed salts delivered from the thickener $7^a$ to dissolver 5 will contain a considerable proportion of adhering mother liquor. I, therefore, make proper allowance when removing the portion of cold liquor from the cooling tank 7 for this amount of adhering liquor returned with those salts, and withdraw a corresponding additional amount of liquor from the cooling tank at each cycle of operation.

It should be noted that the present method is suitable for the recovery of potassium chloride from brines of varying compositions and is equally applicable to brines containing low as well as a high percentage of magnesium chloride, and is furthermore, with suitable modifications, also applicable to brines containing a considerable percentage of sulphate. In some cases where there is a large quantity of sulphate or magnesium chloride present, it will not be advisable to attempt to harvest separately crude potassium-sodium chloride salts, but to harvest instead, a mixture of potassium, sodium and magnesium chloride.

One of the chief advantages in the process for brines in which the magnesium chloride contents is low, is the larger percentage of potassium chloride recovered from the original salts within the refinery, and the elimination of the additional cost of re-evaporating and re-harvesting the potassium chloride contents of the magnesium chloride bearing liquor, which is discharged at each cycle.

The washing of the potassium-magnesium chloride salts will, in most cases, be preferably done by cold mother liquor from the cooling tanks from which the potassium chloride is precipitated. It is, however, not essential to the process that said salts be washed with this particular liquor. In fact, any liquor which is not saturated with magnesium chloride, and, therefore, capable of dissolving from said salts a part of their magnesium chloride contents, and which at the same time will dissolve but a small proportion of the potassium chloride contents, may be used. For example, one thousand grams of water at twenty five degrees centigrade, will dissolve roughly three hundred seventy three grams of magnesium chloride, and only approximately forty six grams of potassium chloride. Therefore, if the proper proportion of water at this temperature is used to wash pure carnallite which contains approximately thirty four per cent magnesium chloride, twenty seven per cent potassium chloride and thirty nine per cent water, satisfactory results may be obtained and the residual salts treated in the hot dissolver as previously described.

By the method above described I am enabled to treat brines high in magnesium chloride and to reduce the potassium chloride content of the liquors discharged from the refinery and to also reduce the magnesium chloride contents of the crude salts from vat 3 before these salts are introduced into the hot dissolver 5.

Having thus described my invention, what I claim and desire to secure by Letters Patent is:

1. The method of recovering potassium chloride from salts containing magnesium and potassium chlorides, which consists in washing said salts with potassium chloride liquor at approximately atmospheric temperature to thereby dissolve the magnesium chloride content of said salts and to force out from the solvent liquor a portion of the potassium chloride content thereof by replacement of the potassium chloride of the liquor with the magnesium chloride of the salts, separating the resulting washed crystalline material from the liquor, dissolving the potassium chloride content of said crystalline material by means of hot solvent to form a hot saturated potassium chloride solution containing so small a proportion of magnesium chloride that upon cooling, potassium chloride will precipitate without the precipitation of sodium chloride separating while hot the said potassium-saturated solution from the undissolved solids, cooling said potassium-saturated solution and depositing potassium chloride, and separating said potassium chloride from the cooled mother liquor.

2. The method of recovering potassium chloride from brine containing potassium, sodium and magnesium chlorides, which consists in producing by solar evaporation a crude crystalline material which is richer in potassium than the brine, washing said crude crystalline material with potassium chloride liquor at approximately atmospheric temperature to thereby dissolve the magnesium chloride of the crystals and to force out from the solvent liquor a portion of the potassium chloride content thereof by replacement of the potassium chloride of the liquor with magnesium chloride of the solid, separating the resulting washed crystalline material from the liquor, dissolving the potassium chloride content of said crystalline material by means of hot solvent to form a hot saturated potassium chloride solution containing so small a proportion of magnesium chloride that upon cooling, potassium chloride will precipitate without the precipitation of sodium chloride, separating while hot the said potassium-saturated solution from the undissolved solids, cooling said potassium-saturated solution and depositing potassium chloride, and separating said potassium chloride from the cooled mother liquor.

3. The method of recovering potassium chloride from brine containing potassium, sodium and magnesium chlorides, which consists in producing crude carnallite by polar evaporation, washing the carnallite with potassium chloride liquor at approximately atmospheric temperature to thereby dissolve the magnesium chloride of the carnallite and to force out from the solvent liquor a portion of the potassium chloride content thereof by replacement of the potassium chloride of the liquor with magnesium chloride of the carnallite, separating the resulting washed crystalline material from the liquor, evaporating said liquor for the further formation of carnallite, dissolving the potassium chloride content of said crystalline material by means of hot solvent to form a hot saturated potassium chloride solution containing so small a proportion of magnesium chloride that upon cooling, potassium chloride will precipitate without the precipitation of sodium chloride, separating while hot the said potassium saturated solution from the undissolved solids, cooling said potassium saturated solution and depositing potassium chloride, and separating said potassium chloride from the cooled mother liquor.

4. The method of recovering potassium chloride from brine containing potassium, sodium and magnesium chlorides, which consists in producing carnallite by solar evaporation, washing the carnallite with brine containing potassium chloride at approximately atmospheric temperature to thereby dissolve the magnesium chloride of the carnallite and to force out from the solvent liquor a portion of the potassium chloride content thereof by replacement of the potassium chloride of the liquor with magnesium chloride of the carnallite, separating the resulting washed crystalline material from the liquor, evaporating said liquor by solar evaporation for the further formation of carnallite, dissolving the potassium chloride content of said crystalline material by means of hot solvent to form a hot saturated potassium chloride solution containing so small a proportion of magnesium chloride that upon cooling, potassium chloride will precipitate without the precipitation of sodium chloride, separating while hot the said potassium saturated solution from the undissolved solids, cooling said potassium saturated solution and depositing potassium chloride, and separating said potassium chloride from the cooled mother liquor.

5. The method of recovering potassium chloride from salts containing magnesium and potassium which consists in washing said salts with a liquor capable of dissolving a greater proportion of the magnesium chloride content than of the potassium chloride content of said salts, separating the resulting washed crystalline material from the resulting liquor, dissolving the potassium chloride content of said crystalline material by means of a hot solvent to form a hot saturated potassium chloride solution containing so small a proportion of magnesium chloride that upon cooling, the potassium chloride will precipitate without the precipitation of sodium chloride, separating while hot, the said potassium-saturated solution from the undissolved solids, cooling said potassium-saturated solution and depositing potassium chloride, and separating said potassium chloride from the cooled mother liquor.

In testimony whereof, I affix my signature in presence of two witnesses.

JOSEPH L. SILSBEE.

Witnesses:
WILLIAM R. THOMAS,
JEAN M. HURST.